United States Patent
Lundgren et al.

(10) Patent No.: US 9,294,513 B2
(45) Date of Patent: Mar. 22, 2016

(54) METHOD AND SYSTEM FOR PROVIDING EMERGENCY RELATED SERVICES VIA A BROADBAND GATEWAY

(75) Inventors: David Lundgren, Mill Valley, CA (US); Jeyhan Karaoguz, Irvine, CA (US); Xuemin (Sherman) Chen, San Diego, CA (US); Wael William Diab, San Francisco, CA (US); David Garrett, Tustin, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 1124 days.

(21) Appl. No.: 12/982,442

(22) Filed: Dec. 30, 2010

(65) Prior Publication Data

US 2011/0300825 A1    Dec. 8, 2011

Related U.S. Application Data (60) Provisional application No. 61/351,696, filed on Jun. 4, 2010.

(51) Int. Cl.
*H04L 12/28* (2006.01)
*H04L 29/06* (2006.01)
(Continued)

(52) U.S. Cl.
CPC .............. *H04L 63/205* (2013.01); *G05B 13/02* (2013.01); *G05F 1/66* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/66* (2013.01); *H04L 41/32* (2013.01); *H04L 47/2491* (2013.01); *H04L 63/0281* (2013.01); *H04L 63/10* (2013.01); *H04L 65/102* (2013.01); *H04L 65/40* (2013.01); *H04L 67/10* (2013.01); *H04L 67/1095* (2013.01); *H04L 67/12* (2013.01); *H04N 5/445* (2013.01); *H04N 21/482* (2013.01);
(Continued)

(58) Field of Classification Search
CPC .... H04W 4/22; H04W 76/007; G08B 25/016; G08B 13/19695; G08B 21/02; G08B 21/0211; G08B 21/0453; G08B 25/006; G08B 25/012
See application file for complete search history.

(56) References Cited

U.S. PATENT DOCUMENTS 8,036,716 B2 * 10/2011 Dunn et al. .................... 455/570
2003/0129977 A1 * 7/2003 Dolwin ........................ 455/422

(Continued)

*Primary Examiner* — Mounir Moutaouakil
(74) *Attorney, Agent, or Firm* — Foley & Lardner LLP; Christopher J. McKenna; Paul M. H. Pua (57) ABSTRACT

Aspects of a method and system for providing emergency-related services via a broadband gateway are provided. In this regard, a broadband gateway may receive one or more emergency notification messages, generate one or more alert messages in response to the received emergency notification message(s), and communicate the alert message(s) to the electronic device(s). Accordingly, each of the one or more alert messages may be formatted for communication to a corresponding one or corresponding ones of the one or more electronic devices. The emergency notification message(s) may be generated by an emergency services provider in response to an emergency. The emergency services provider may send a notification message to the broadband gateway device upon determining that the broadband gateway device, a person associated with the broadband gateway device, and/ or a location associated with the broadband gateway device meets particular criteria.

21 Claims, 8 Drawing Sheets

(51) Int. Cl.
| | |
|---|---|
| H04W 12/08 | (2009.01) |
| H04N 21/63 | (2011.01) |
| G06Q 20/10 | (2012.01) |
| H04L 12/24 | (2006.01) |
| H04L 12/857 | (2013.01) |
| G06Q 30/02 | (2012.01) |
| G06F 21/10 | (2013.01) |
| G06Q 40/00 | (2012.01) |
| G05B 13/02 | (2006.01) |
| G05F 1/66 | (2006.01) |
| G06Q 30/04 | (2012.01) |
| H04L 12/14 | (2006.01) |
| H04L 12/66 | (2006.01) |
| H04N 5/445 | (2011.01) |
| H04N 21/482 | (2011.01) |
| H04N 21/472 | (2011.01) |
| H04L 29/08 | (2006.01) |

(52) U.S. Cl.
CPC ............. *H04N 21/632* (2013.01); *H04W 12/08* (2013.01); *G06F 2221/07* (2013.01); *H04L 41/5019* (2013.01); *H04L 65/4084* (2013.01); *H04L 67/104* (2013.01); *H04N 21/47202* (2013.01)

(56) References Cited

U.S. PATENT DOCUMENTS

| | | | |
|---|---|---|---|
| 2003/0156543 | A1 | 8/2003 | Sahinoglu et al. |
| 2007/0072583 | A1* | 3/2007 | Barbeau et al. ............ 455/404.2 |
| 2007/0206513 | A1 | 9/2007 | Cho et al. |
| 2008/0143539 | A1* | 6/2008 | McSheffrey et al. ......... 340/584 |
| 2008/0159304 | A1 | 7/2008 | Ozugur et al. |
| 2008/0291849 | A1* | 11/2008 | Ostermeier et al. .......... 370/270 |
| 2009/0023481 | A1* | 1/2009 | Foster et al. .................. 455/573 |
| 2009/0170467 | A1* | 7/2009 | Nowlan et al. ............. 455/404.1 |
| 2010/0159943 | A1* | 6/2010 | Salmon ...................... 455/456.1 |
| 2010/0184411 | A1 | 7/2010 | Chen et al. |
| 2010/0184414 | A1 | 7/2010 | Abraham et al. |
| 2010/0184450 | A1 | 7/2010 | Chen et al. |
| 2010/0186027 | A1 | 7/2010 | Hou et al. |
| 2010/0210239 | A1 | 8/2010 | Karaoguz et al. |
| 2010/0215029 | A1 | 8/2010 | Karaoguz et al. |
| 2010/0220692 | A1 | 9/2010 | Diab et al. |
| 2010/0220731 | A1 | 9/2010 | Diab et al. |
| 2010/0231379 | A1* | 9/2010 | Hutzler et al. ........... 340/539.12 |
| 2013/0276018 | A1* | 10/2013 | Walter et al. .................... 725/25 |

* cited by examiner

METHOD AND SYSTEM FOR PROVIDING EMERGENCY RELATED SERVICES VIA A BROADBAND GATEWAY

CLAIM OF PRIORITY

This patent application makes reference to, claims priority to and claims benefit from U.S. Provisional Patent Application Ser. No. 61/351,69filed on Jun. 4, 2010.

The above stated application is hereby incorporated herein by reference in its entirety.

INCORPORATION BY REFERENCE

This application also makes reference to:
U.S. patent application Ser. No. 12/982,231 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Feb. 27, 2009;
U.S. patent application Ser. No. 12/355,537 filed on Jan. 16, 2009;
U.S. patent application Ser. No. 12/355,480 filed on Jan. 16, 2009;
U.S. patent application Ser. No. 12/372,648 filed on Feb. 17, 2009;
U.S. patent application Ser. No. 12/355,413 filed on Jan. 16, 2009, 2009;
U.S. patent application Ser. No. 12/355,377 filed on Jan. 16, 2009, 2009;
U.S. patent application Ser. No. 12/395,470 filed on Feb. 27, 2009; and
U.S. patent application Ser. No. 12/391,009 filed on Feb. 23, 2009;

Each of the above stated applications is hereby incorporated herein by reference in its entirety.

FIELD OF THE INVENTION

Certain embodiments of the invention relate to networking. More specifically, certain embodiments of the invention relate to a method and system for providing emergency-related services via a broadband gateway.

BACKGROUND OF THE INVENTION

Existing public announcement and emergency broadcast systems are limited in their abilities to reach citizens. In this regard, if a person is not listening to the radio, watching television, or within earshot of an emergency siren, that person is at risk of not being alerted to the emergency in a timely manner.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing emergency-related services via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing emergency-related services via a broadband gateway. In various embodiments of the invention, a broadband gateway may enable communication with one or more electronic devices and may be operable handle at least one physical layer connection to at least one network access service provider. The gateway may receive one or more emergency notification messages, generate one or more alert messages in response to the received one or more emergency notification messages, and communicate the one or more alert messages to the one or more electronic devices. Accordingly, each of the one or more alert messages may be formatted for communication to a corresponding one or corresponding ones of the one or more electronic devices. The broadband gateway may receive the one or more emergency notification messages via the at least one physical layer connection to at least one network access service provider. The one or more emergency notification messages may be generated by an emergency services provider in response to an emergency. The emergency services provider may send a notification message to the broadband gateway upon determining that a location of the broadband gateway is affected by the emergency and/or upon determining that the broadband gateway, a person associated with the broadband gateway, and/or a location associated with the broadband gateway meets particular criteria. The location of the broadband gateway may be determined utilizing one or more of a cellular receiver of the broadband gateway, a Global Navigation Satellite System (GNSS) receiver of the broadband gateway, a network address of the broadband gateway, account information associated with the broadband gateway, a telephone number associated with the broadband gateway, and user input provided to the broadband gateway.

The emergency notification messages may be received from one or more of the electronic devices. In response, the broadband gateway may generate one or more alert messages formatted for communication over the at least one physical layer connection to at least one network access service provider and may communicate one or more of the alert messages to an emergency services provider and/or to one or more other broadband gateways. The other broadband gateways to which alert messages are sent may be determined based on one or both of: whether the broadband gateway and the other broadband gateways, and user information associated with the broadband gateway and the other broadband gateways. The electronic devices may comprise devices utilized by first responders upon arriving at a location of the broadband gateway. The broadband gateway may also transmit location specific information to the one or more electronic devices, where the location specific information comprises one or both of medical information for people associated with a location of the broadband gateway, and structural information about the location of the broadband gateway.

Figure 1:
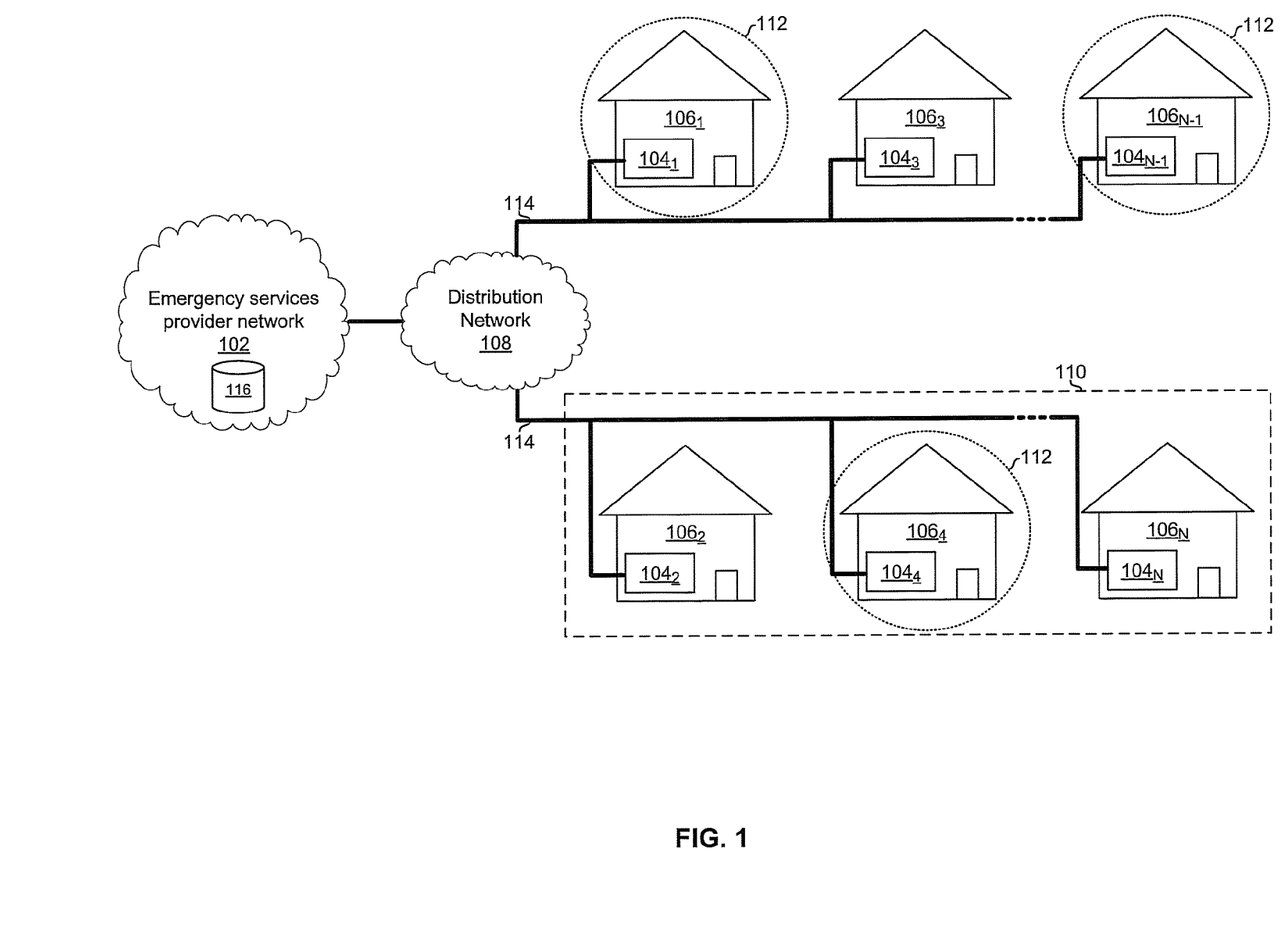
FIG. 1 is a diagram illustrating an emergency services system in which emergency services are provided via broadband gateway, in accordance with an embodiment of the invention.

FIG. 1 is a diagram illustrating an emergency services system in which emergency services are provided via broadband gateways, in accordance with an embodiment of the invention. Referring to FIG. 1 there is shown an emergency services provider network 102 communicatively coupled to broadband gateways $104_1$-$104_N$ in corresponding locations $106_1$-$106_N$ via one or more distribution networks 108 and links 114.

The emergency services provider network 102 may be associated with, for example, a public entity such as a 911 center, Public Safety Answering Point (PASP) and/or a private entity such as a security company. The emergency services provider network 102 may comprise storage 116 that may store information pertaining to the broadband gateways $104_1$-$104_N$. The storage 116 may comprise one or more databases such that the information may be searched, sorted, and/or filtered. Such information may comprise, for example, characteristics and/or capabilities of the broadband gateways $104_1$-$104_N$, and/or characteristics of users and/or account holders associated with the broadband gateways $104_1$-$104_N$.

The information in the storage 116 may comprise information about the location of the devices $104_1$-$104_N$. The location of a broadband gateway $104_n$, where n is an integer between 1 and N, inclusive, may be determined utilizing a cellular interface, a GNSS receiver, a WLAN interface, and/or some other interface of the broadband gateway $104_n$. Additionally or alternatively, the location information for the broadband gateway $104_n$ may comprise one or more network addresses associated with the broadband gateway $104_n$, one or more telephone numbers associated with the broadband gateway $104_n$, and/or a street address associated with the broadband gateway $104_n$. In this regard, information such as a street address of the broadband gateway $104_n$ may be provided by a user or account holder associated with the broadband gateway $104_n$, and may, for example, be entered by the user or by a service provider upon installation and setup of the broadband gateway $104_n$.

The distribution network(s) 108 may be wired, optical, and/or wireless and may enable the communication of voice and/or data. Exemplary distribution networks may comprise cable, satellite, terrestrial broadcast channels, and/or other suitable media. The links 114 may be part of the distribution network(s) 108. The links 114 may be optical, wired, and/or wireless. In some instances, a single broadband gateway $104_n$ may be coupled to a plurality of links 114 associated with a plurality of distribution network(s) 108. In this regard, a single gateway $104_n$ may be operable to handle multiple physical layer (i.e., layer 1 of the open-systems interconnection model) connections to multiple ones or multiple portions of the distribution network(s) 108, where different ones or portions of the distribution network(s) 108 are owned, operated, leased, or otherwise associated with different network access service providers. In some instances, the gateway $104_n$ may be operable to concurrently communicate over the multiple physical layer connections with multiple network access services providers. For example, a gateway $104_n$ may communicate with a DSL service provider via DSL over twisted-pair and concurrently communicate with a cable service provider via a CATV connection over coaxial cable.

In operation, emergency-related messages may be communicated between the emergency service provider network 102 and the broadband gateways $104_1$-$104_N$ via the distribution network(s) 108 and the links 114.

In some instances, emergency-related messages may originate in the emergency services provider network 102 and be sent to one or more of the broadband gateways $104_1$-$104_N$. For example, a storm warning or a fire warning may be issued for the area 110 by the emergency services provider. As a result, the emergency services provider may determine, utilizing the storage 116, which ones of the broadband gateways $104_1$-$104_N$, are located in the area 110, and may send one or more emergency notification messages to those broadband gateways. For another example, an event affecting broadband gateways in the logical group 112 may occur and the emergency services provider may communicate emergency notification messages to the broadband gateways in the group 112. In this regard, the group 112 may comprise a subset of the broadband gateways $104_1$-$104_N$ that share particular characteristics or whose users share particular characteristics. The characteristics may be stored in the storage 116 and thus the group 112 may be determined by searching, filtering, and/or sorting entries in the storage 116. Characteristics may comprise, for example, user preferences associated with one or more of the broadband gateways $104_1$-$104_N$, medical information associated with users of one or more of the broadband gateways $104_1$-$104_N$, structural information associated with the locations $106_1$-$106_N$, tags or metadata provided by users of the broadband gateways $104_1$-$104_N$, purchased services associated with one or more of the broadband gateways $104_1$-$104_N$, usage history associated with one or more of the broadband gateways $104_1$-$104_N$, and payment history for accounts associated with the broadband gateways $104_1$-$104_N$.

In some instances, emergency-related messages may originate in a location $106_n$ and may be communicated by the broadband gateway $104_n$ to other ones of the broadband gateways $104_1$-$104_N$ and/or to the emergency services provider network 102. For example, a security, smoke, or carbon monoxide alarm at the location $106_n$ may send an emergency notification message to the broadband gateway $104_n$ and, in response, the broadband gateway $104_n$ may generate and send out one or more alert messages.

One or more alert messages may be sent to other electronic devices at the location $106_n$. In this manner, an alert in one part of the location $106_n$ may be spread to various devices in the location $106_n$ to improve the chances that the alert will not be missed by inhabitants. Additionally or alternatively, one or more alert messages may be sent to other ones one of the broadband gateways $104_1$-$104_N$. In this regard, alert messages may be sent to broadband gateways in a physical or geographical area, such as the area 110, and/or may be sent to a logical group of broadband gateways, such as the group 112. For example, neighbors may be alerted to a medical emergency or carbon dioxide alarm as they may be able to provide assistance sooner than emergency services may be able to arrive on scene. In another example, alert messages may be sent to broadband gateways associated with friends and/or family of the inhabitant of the location $106_n$. In this regard, the broadband gateway $104_n$ may store information similar to, but perhaps less extensive than, the information stored in the storage 116. Additionally or alternatively, one or more of the alert messages may be sent to the emergency services provider network 102 such that emergency services providers such as police, fire fighters, and/or paramedics may be sent to the location.

Figure 2:
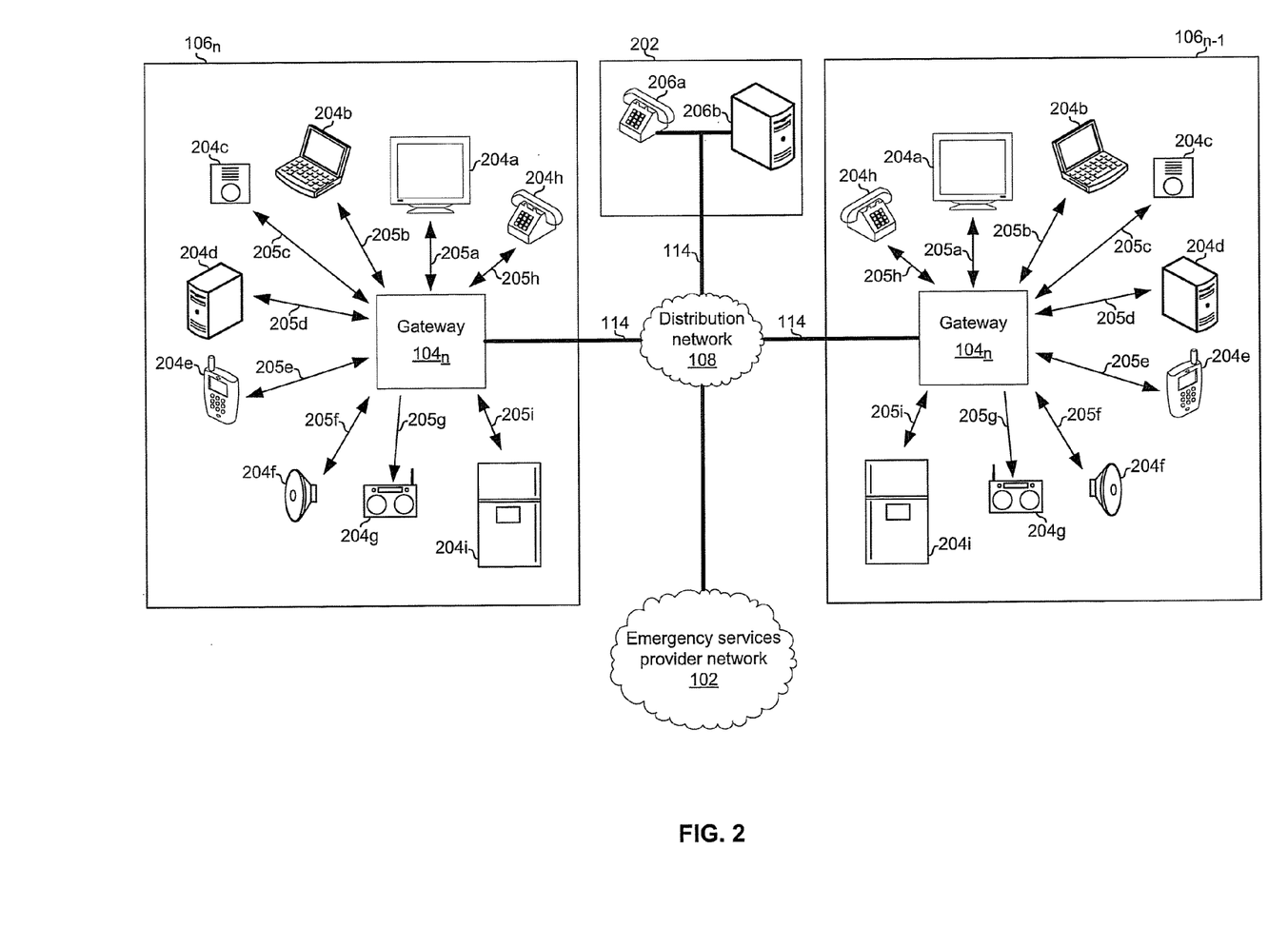
FIG. 2 is a diagram illustrating locations which participate in an emergency services system in which emergency services are provided via broadband gateway, in accordance with an embodiment of the invention.

FIG. 2 is a diagram illustrating locations which participate in an emergency services system in which emergency services are provided via broadband gateways, in accordance with an embodiment of the invention. Referring to FIG. 2 there is shown the emergency services provider network 102, the distribution network 108, two of the broadband gateway-equipped locations 106, and a non-broadband gateway equipped location 202. Each of the locations $104_n$ and $104_{n-1}$ comprises a broadband gateway 104 communicatively coupled to a plurality of electronic devices 204 via links 205. The devices 204 may also be referred to as communication devices. The location 202 comprises electronic devices 206.

The electronic devices 204 may comprise, for example, one or more of a television 204a, a laptop computer 204b, a smoke, carbon monoxide, and/or security alarm 204c, a computer and/or server 204d, a mobile phone 204e, a speaker 204f, a AM/FM radio 204g, a phone 204h, and an appliance 204i. The link 205a may comprise, for example, an HDMI cable. The link 205b may comprise, for example, a wired Ethernet link, a wireless Ethernet link, a USB link, or an IEEE 1394 link. The link 205c may comprise, for example, a two-wire link or a wireless link. The link 205d may comprise, for example, a wired Ethernet link, a wireless Ethernet link, a USB link, or an IEEE 1394 link. The link 205e may comprise, for example, a wireless Ethernet link, a USB link, or a cellular link. The link 205f may comprise speaker wire and/or a wireless link. The link 205g may comprise, for example, AM and/or FM radio transmissions broadcast by the broadband gateway 104. The link 205h may comprise, for example, a phone line. The link 205i may comprise, for example, a wired or wireless Ethernet link. The electronic device 206a may comprise a telephone coupled to a plain old telephone system (POTS). The electronic device 206 may comprise a computer, server, or other networked device.

In operation, an emergency notification message may be generated in the emergency service provider network 102 and communicated to the broadband gateways $104_n$ and $104_{n-1}$ via the distribution network 108. Upon receiving the emergency notification message, each of the broadband gateways $104_n$ and $104_{n-1}$ may generate one or more alert messages formatted for communication to one or more of the electronic devices 204 via a corresponding one or more of the links 205. In this manner, distributing the messages to multiple devices 204 in the locations $106_n$ and $106_{n-1}$ may increase the chances of the inhabitants being alerted. For example, the broadband gateway $104_n$ may place a call to the 204h, display a message on the TV 204a if the TV is on, send an email, instant message or other notification to the laptop 204b, trigger the alarm 204c, send a text message or place a call to the mobile phone 204e, output an audible alarm signal to the speaker 204f, or broadcast an alarm on one or more AM and/or FM frequencies which may be received by the radio 204g.

An emergency notification message may be generated in the location $106_n$. For example, the alarm 204c in the location $106_n$ may send an emergency notification message to the broadband gateway $104_n$. In response, the broadband gateway $104_n$ may generate one or more alert messages. One or more alert messages generated by the broadband gateway 104n may be communicated to other ones of the electronic devices 104 in the location $106_n$, as described in the previous paragraph. In this manner, distributing the messages to multiple devices in the locations $106_n$ may increase the chances of the inhabitants being alerted. Additionally or alternatively, one or more alert messages generated by the broadband gateway $104_n$ may be communicated to other broadband gateways such as the broadband gateway $104_{n-1}$. For example, the location $106_{n-1}$ may be a neighbor of the location $106_n$ and an alert message may be sent to the broadband gateway $104_{n-1}$ to alert the neighbor of an emergency that may effect the neighbor and/or so that the neighbor may come over to the location $106_n$ to provide assistance. In another example, the location $106_{n-1}$ may not be physically near the location $106_n$ but may be inhabited by friends, family, caretakers, or other individuals having interest in an emergency at the location $106_n$. Additionally or alternatively, one or more alert messages generated by the broadband gateway $104_n$ may be communicated to the emergency services provider network 102 such that emergency response professionals may be dispatched to the location $106_n$. Additionally and/or alternatively, one or more alert messages generated by the broadband gateway 104n may be communicated to the non-broadband gateway equipped location 202. For example, the broadband gateway $104_n$ may call the phone 206a and play a pre-recorded message or send an email, instant message, and/or other notification to the computer 206b.

The broadband gateway $104_n$ may also broadcast location specific information such that, upon arriving at the location $106_n$, emergency response professionals may receive the broadcast information and utilize that information to address the emergency. The broadband gateway $104_n$ may broadcast the information utilizing, for example, Wi-Fi, AM or FM radio, and/or cellular transmit capabilities. The location specific information may comprise, for example, medical information about the inhabitants of the location 106n and/or structural information about the location $106_n$. Examples of medical information comprise, for example, medications, allergies, and medical conditions. Examples of structural information comprise floor plans, blueprints, gas shut-off valve locations, presence and/or location of flammable and/or explosive materials.

Figure 3A:
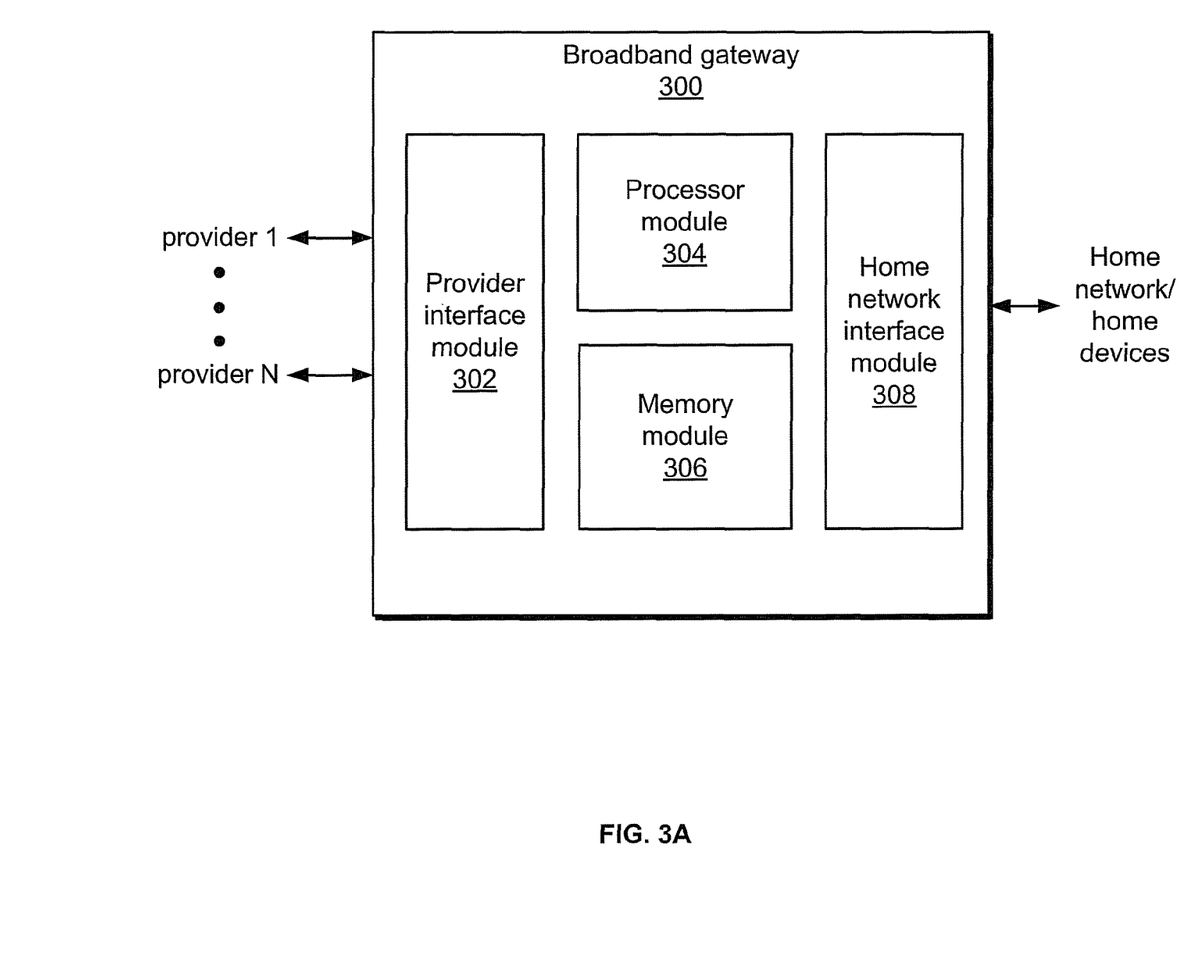
FIG. 3A is a diagram illustrating an example of a broadband gateway operable to provide emergency services, in accordance with an embodiment of the invention.

FIG. 3A is a diagram illustrating an example of a broadband gateway operable to provide emergency services, in accordance with an embodiment of the invention. The broadband gateway 300 may comprise suitable logic, circuitry, code, and/or interfaces that may be operable to provide connectivity between a network, such as the Internet or other wide area network, for example, and one or more devices in a home. In this regard, the broadband gateway 300 may operate as an interface device that allows one or more service and/or content (service/content) providers to interact with various devices in the home.

The broadband gateway 300 may communicate with the various devices in the home via a home network, which may comprise wired and/or wireless communication links. In this regard, the broadband gateway 300 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, broadband gateway 300 may communicate with the various devices in the home via more than one home network.

The broadband gateway 300 may comprise one or more modules. Each of these modules may comprise hardware, software, or a combination thereof. In an embodiment of the invention, the broadband gateway 300 may comprise a provider interface module 302, a processor module 304, a memory module 306, and a client network interface module 308. In some instances, the broadband gateway 300 may be such that the various modules listed above may be distributed over multiple devices. Moreover, the modules listed above are provided by way of illustration and not of limitation. Other configurations and/or architectures of the broadband gateway 300 may be implemented. For example, the broadband gateway 300 may be a virtual gateway setup in a network by utilizing virtual machines (VMs) and/or next-generation (NG) data centers.

The provider interface module 302 may comprise suitable logic, circuitry, code, and/or interfaces that may be operable to receive data from one or more service/content providers. The provider interface module 302 may also be operable to send data to one or more service/content providers. While not shown in FIG. 3B, the provider interface module 302 may be utilized to receive data from third parties and/or send data to third parties. The provider interface module 302 may be operable to support multiple communication protocols, standards, and/or data transport technologies. Each of the service/content providers 1 through N illustrated in FIG. 3B may correspond to a different service/content provider. The provider interface module 302 may be communicatively coupled to the service/content providers via wired and/or wireless communication links.

The processor module 304 may comprise suitable logic, circuitry, code, and/or interlaces that may be operable to process data received from the service/content providers and/or data received from one or more devices in the home. In this regard, the processor module 304 may comprise one or more portions that are suitable to handle certain types of data such as video data and/or audio data, for example.

The memory module 306 may comprise suitable logic, circuitry, code, and/or interfaces that may be operable to store data utilized in the operations of the broadband gateway 300. For example, the memory module 306 may be utilized to store configuration data, parameters, device information, tracking and/or monitoring information, security information, and intermediate processing data, for example. The memory module 306 may comprise storage media integrated in the broadband gateway 300 and/or a removable storage device.

The client network interface module 308 may comprise suitable logic, circuitry, code, and/or interfaces that may be operable to send data to one or more devices in the home via the home network. The client network interface module 308 may also be operable to receive data from one or more devices in the home via the home network. The client network interface module 308 may be operable to support multiple communication protocols, standards, and/or data transport technologies.

The broadband gateway 300 may be operable to provide energy management by varying the configuration of one or more devices in the home network. The broadband gateway 300 may collect and/or store energy-related information for one or more devices and/or for the home network, and may utilize such information to control the operation of those devices. For example, the broadband gateway 300 may utilize channel capacity flexibility and content coding options to minimize and/or optimize power utilization. The broadband gateway 300 may also configure and/or manage the configuration of the network between the broadband gateway 300 and one or more service/content providers based on the energy-related information associated with the devices in the home. The broadband gateway 300 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 300 may be utilized to provide that information to a service/content provider and obtain rewards/credits associated with the use of such certified devices. Moreover, overall network power consumption may be managed by sharing information among multiple interconnected broadband gateways.

The broadband gateway 300 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 300 may be utilized to reduce bandwidth and/or power consumption in the home network. The broadband gateway 300 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 300 to one or more other broadband gateways 300. In some instances, a visitor may be allowed access to their content outside their service/content provider service area by, for example, classifying the access level for different users and/or by providing limited access to content. Moreover, the broadband gateway 300 may allow multiple user interface software structures by, for example, standardizing an interface to service/content providers and devices in the home network.

The broadband gateway 300 may be operable to broker and/or arbitrate with service/content providers the consumption of certain services, such as music and video, for example. In some instances, the broadband gateway 300 may perform content search, transport discovery, ranking, and/or sorting. These operations may be performed based on content quality, price, quality-of-service (QOS), and network protocols supported by the devices in the home network, such as service level agreements (SLAs), for example.

As described more completely described with reference to FIGS. 1, 2, 3B, 4-7, various emergency-related services in the home network may be supported by the broadband gateway 300. For example, the broadband gateway 300 may enable first responders to provide alerts to a select group of users by accessing the broadband gateway 300 via secure links provided by the service/content providers.

Customized graphical user interfaces (GUIs) may be generated by the broadband gateway 300, wherein the GUIs may be used to visually display and/or provide interaction with the customized content.

For peer-to-peer communication, the broadband gateway 300 may be utilized to allow enhanced content sharing in a service/content provider network. In this regard, the broadband gateway 300 may be utilized to construct a directory service for peer-to-peer connectivity with friends and family, for example. The broadband gateway 300 may be utilized to provide incentives to users who engage in peer-to-peer communication. Moreover, the broadband gateway 300 may be utilized to match the content coding to the service type being consumed by the user and to make the necessary allocations through the network with respect to peer-to-peer or conventional Internet programming or broadcast programming.

The broadband gateway 300 may be utilized in connection with constrained network resources, such as time of day, traffic congestion, and the like, for example, to provide incentives for a user to accept a lower cost, lower quality of service that is dynamically configured for current network conditions. In some instances, the broadband gateway 300 may allow enhanced low latency service delivery to client devices in a home network.

The broadband gateway 300 may be operable to run or execute an agent to extract content, rating, copyright, language, privacy rules, and automatically add user generated content, for example. In some instances, the broadband gateway 300 may provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 300.

The broadband gateway 300 may be operable to combine and/or blend multiple contents for use as single content in the home network. For example, the broadband gateway 300 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 300. Only when a user authorizes the transfer of the confidential data will such data be stored and/or aggregated. The broadband gateway 300 may be operable to create a trusted rating mechanism for content. The broadband gateway 300 may be secure against external threats that may be downloaded from outside the home network and may provide a secure domain distribution in the home network. Automated and secured billing and payment services may also be provided by the broadband gateway 300. Moreover, the broadband gateway 300 may be operable to filter and/or block specific content or portions thereof, and may also be utilized to govern client content access, which may be based on controlled user profiles and/or authorization requests to one or more additional client devices.

The broadband gateway 300 may be operable to utilize client profile information to select layered video service(s) and/or transmission. In some instances, the programming and/or enhanced video layers received by the broadband gateway 300 may be aggregated midstream by one or more network or routing nodes.

The broadband gateway 300 may support a reduction in the cost of unwatched content by using multi-tier billing for downloaded content, such as video content. The broadband gateway 300 may be utilized to provide a unified payment portal for collecting and/or aggregating charges from multiple service and/or content providers.

Figure 3B:
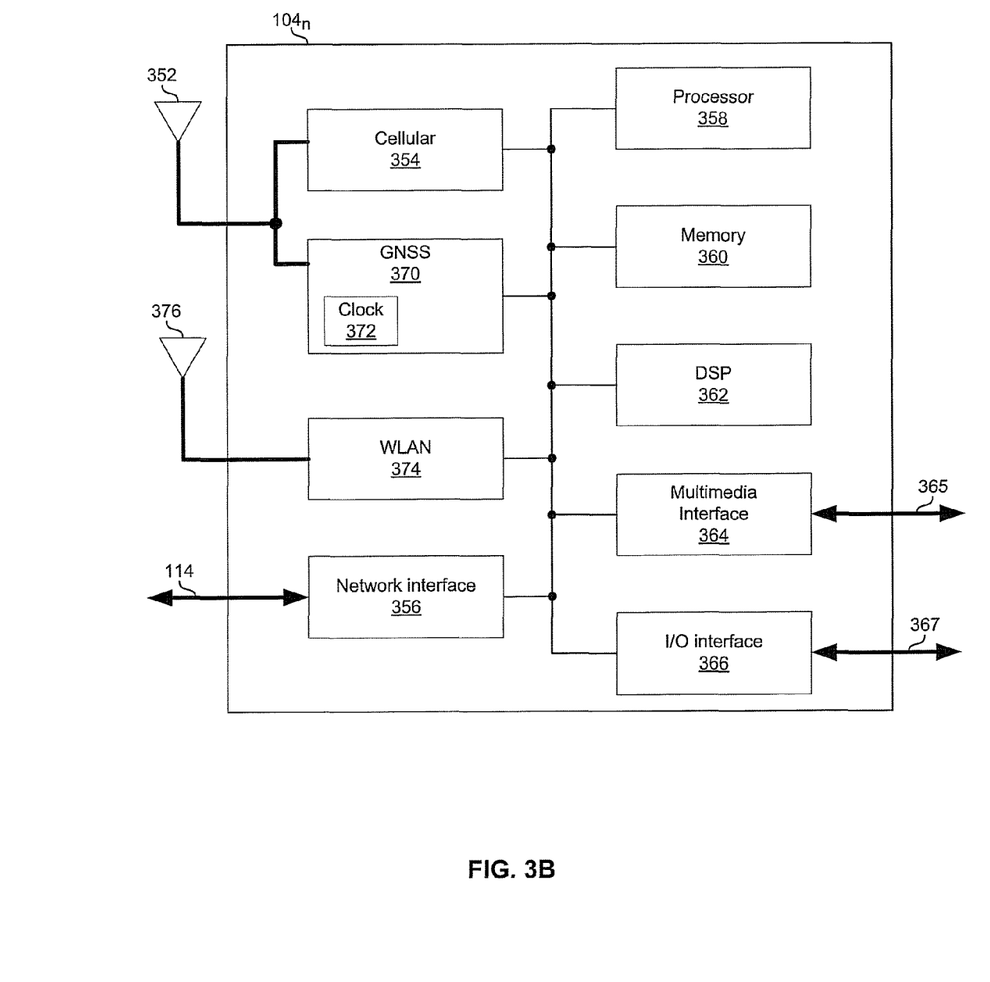
FIG. 3B is a diagram illustrating another example of a broadband gateway operable to provide emergency services, in accordance with an embodiment of the invention.

FIG. 3B is a diagram illustrating another example of a broadband gateway operable to provide emergency services, in accordance with an embodiment of the invention. Referring to FIG. 3 the broadband gateway $104_n$ may comprise an antenna 352, an antenna 376, a global navigation satellite system (GNSS) interface 370, a cellular interface 354, a wireless local area network (WLAN) interface 374, a network interface 356, a processor 358, a memory 360, a digital signal processor (DSP) 362, an multimedia interface 364, and an input and/or output (I/O) interface 366.

The antenna 352 may be suitable for transmitting and/or receiving cellular signals. Although a single antenna is illustrated, the invention is not so limited. In this regard, the cellular interface 354 may utilize a common antenna for transmission and reception, may utilize different antennas for transmission and reception, and/or may utilize a plurality of antennas for transmission and/or reception. Similarly, the cellular interface 354 and the GNSS interface 370 may share an antenna or may utilize different antennas.

The antenna 376 may be suitable for transmitting and/or receiving WLAN signals. Although a single antenna is illustrated, the invention is not so limited. In this regard, the WLAN interface 374 may utilize a common antenna for transmission and reception, may utilize different antennas for transmission and reception, and/or may utilize a plurality of antennas for transmission and/or reception. Similarly, the WLAN interface 374 may share an antenna with one or both of the cellular interface 354 and the GNSS interface 370.

The GNSS interface 370 may comprise suitable logic, circuitry, and/or code that may be operable to receive and process signals from a GNSS system. Exemplary GNSS systems comprise the United State's global positioning system (GPS), Russia's GLONASS, various nations' space-based augmentation systems (SBAS), and the European Union's Galileo. The GNSS interface 370 may comprise a clock 372 and may be operable to maintain the accuracy of the clock 372 based on received GNSS signals. In various embodiments of the invention, the clock 372 may be utilized to synchronize and/or maintain operations of other portions of the broadband gateway $104_n$.

The cellular interface 354 may comprise suitable logic circuitry and/or code that may be operable to transmit and/or receive data utilizing one or more cellular standards. In this manner, the cellular interface 354 may enable the broadband gateway $104_n$ to perform femtocell functions. Exemplary cellular standards supported by the broadband gateway $104_n$ may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The network interface 356 may comprise suitable logic, circuitry, and/or code that may be operable to communicate over the distribution network(s) 108 described with respect to FIGS. 1 and 2. For example, network interface 356 may be operable communicate over, a T1/E1 connection, an optical connection (e.g., xPON), a POTS line, a digital subscriber line (DSL), a cable television connection, a satellite television and/or broadband connection, and/or an Ethernet connection.

The memory 360 may comprise suitable logic, circuitry, and/or code that may enable storage or programming of information comprising parameters and/or code that may effectuate the operation of the broadband gateway $104_n$. The memory 360 may comprise, for example, SRAM, DRAM, flash memory, and/or magnetic storage. The information may comprise received data and/or data to be presented, transmitted, and/or otherwise processed. The information may comprise characteristics of the broadband gateway $104_n$ and/or users thereof, and/or characteristics of other ones of the broadband gateways $104_1$-$104_N$ and/or users thereof. The information 360 may be utilized to determine broadband gateways associated with a location and/or logical grouping. The parameters may comprise configuration data and the code may comprise operational code such as software and/or firmware. Additionally, the memory 360 may buffer or otherwise store multimedia content to be processed and/or processed multimedia content awaiting transmission.

The processor 358 may comprise suitable logic, circuitry, and/or code that may enable processing data and/or controlling operations of the broadband gateway $104_n$. In this regard, the processor 358 may be enabled to provide control signals to the various other portions comprising the broadband gateway $104_n$. The processor 358 may also control transfers of data between various portions of the broadband gateway $104_n$. Additionally, the processor 358 may enable execution of applications programs and/or code stored in memory 360. In various embodiments of the invention, the applications, programs, and/or code may enable, for example, parsing, transcoding, or otherwise processing data. In various embodiments of the invention, the applications, programs, and/or code may enable, for example, receiving emergency notification messages, determining a response.

The DSP 362 may comprise suitable logic, circuitry, and/or code operable to perform computationally intensive processing of data. In various embodiments of the invention, the DSP 362 may encode, decode, transcode, modulate, demodulate, encrypt, decrypt, scramble, descramble, and/or otherwise process digital information.

The multimedia interface 364 may comprise suitable logic, circuitry, and/or code that may be operable to communicate audio and/or visual content to one or more devices for presentation to a user. The audio and/or visual content may be received via one or more of the cellular interface 354, the network interface 356, the WLAN interface 374, and/or the I/O interface 366. The multimedia interface 364 may output, for example, analog and/or digital multimedia signals such as analog audio, composite video, analog RGB video, S-Video, component video, DVI, HDMI, and/or DisplayPort. In this regard, the multimedia interface 364 may be operable to up-convert, filter, modulate, and/or amplify multimedia signals.

The I/O interface 366 may comprise suitable logic, circuitry, and/or code that may be operable to exchange information in accordance with one or more communication standards. Exemplary communication standards supported by the I/O interface 366 may comprise USB, IEEE 1394, infrared (IR), and/or Bluetooth.

In operation, one or more emergency notification messages may be received via one or more of the interfaces 354, 356, 364, and 366. The received emergency notification message may be processed via one or more of the interfaces 354, 356, 364, and 366, and via the processor 358, the memory 360, and/or the DSP 362. The processing may comprise, for example, determining the nature of the emergency, determining which alert messages to generate in response to the notification message, and/or determining where to send the generated alert messages. The generated alert messages may be transmitted via one or more of the interfaces 354, 356, 364, and 366.

While the broadband gateway is shown in FIG. 3 as a single and separate device, the invention need not be so limited. In this regard, functions of the broadband gateway may be distributed among multiple devices and the broadband gateway may be implemented as a virtual platform. In another embodiment of the invention, some or all of the functionality of the broadband gateway may be implemented within one of the televisions available in the home.

Figure 4:
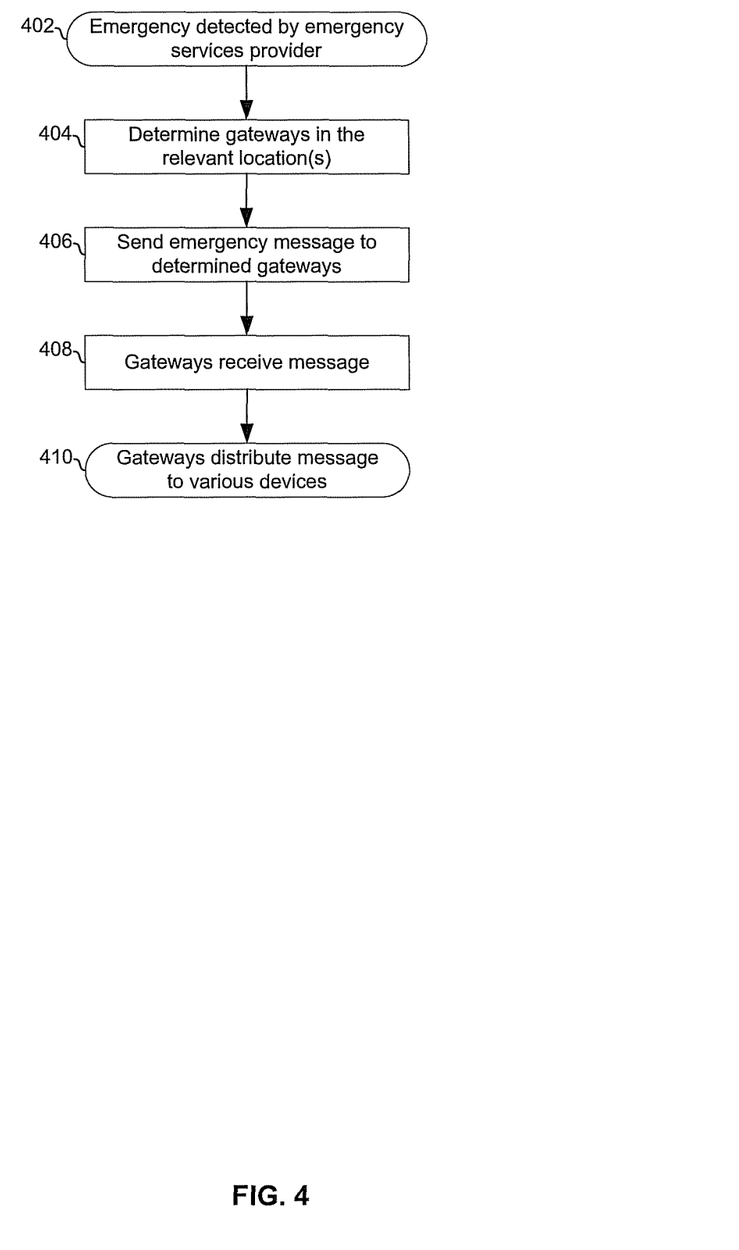
FIG. 4 is a flow chart illustrating exemplary steps for communication of emergency-related messages to physically grouped broadband gateways, in accordance with an embodiment of the invention.

FIG. 4 is a flow chart illustrating exemplary steps for communication of emergency-related messages to physically grouped broadband gateways, in accordance with an embodiment of the invention. Referring to FIG. 4, the exemplary steps may begin with step 402 in which an emergency is detected by an emergency services provider such as the national weather service, the center for disease control, a fire department, a police department, or the military. In step 404, the emergency services provider may determine locations affected by the emergency. For example, the projected path of a storm or fire or flood. In step 406, emergency notification messages may be sent to broadband gateways 104 in the determined location(s). In step 408, the broadband gateways 104 may receive the emergency notification message. In step 410, the broadband gateways 104 may generate alert messages and communicate the alert messages to various electronic devices, such as radios, televisions, phones, computers, and alarms to which they are communicatively coupled.

Figure 5:
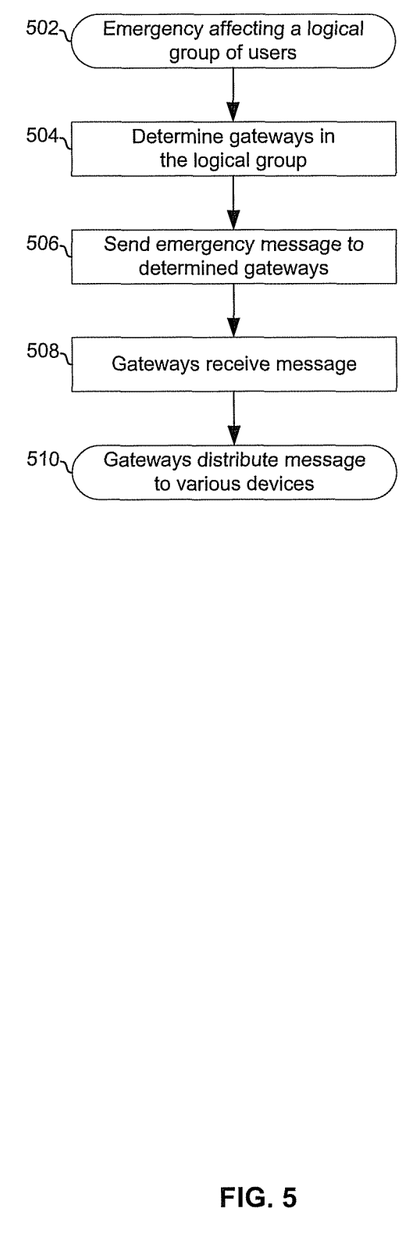
FIG. 5 is a flow chart illustrating exemplary steps for communication of emergency-related messages to logically grouped broadband gateways, in accordance with an embodiment of the invention.

FIG. 5 is a flow chart illustrating exemplary steps for communication of emergency-related messages to logically grouped broadband gateways, in accordance with an embodiment of the invention. Referring to FIG. 5, the exemplary steps may begin with step 502 in which an emergency is detected. The emergency may affect people and/or broadband gateways sharing characteristics other than physical or geographical location. In step 504, the emergency services provider may determine the characteristics of the affected broadband gateways and/or users. The emergency services provider may further determine which of the broadband gateways $104_1$-$104_N$ have such characteristics or are associated with users having such characteristics. In step 506, one or more emergency notification messages may be sent to the broadband gateways determined in step 504. In step 508, the broadband gateways 104 may receive the emergency notification message. In step 510, the broadband gateways 104 may generate alert messages and communicate the alert messages to various electronic devices, such as radios, televisions, phones, computers, and alarms to which they are communicatively coupled.

Figure 6:
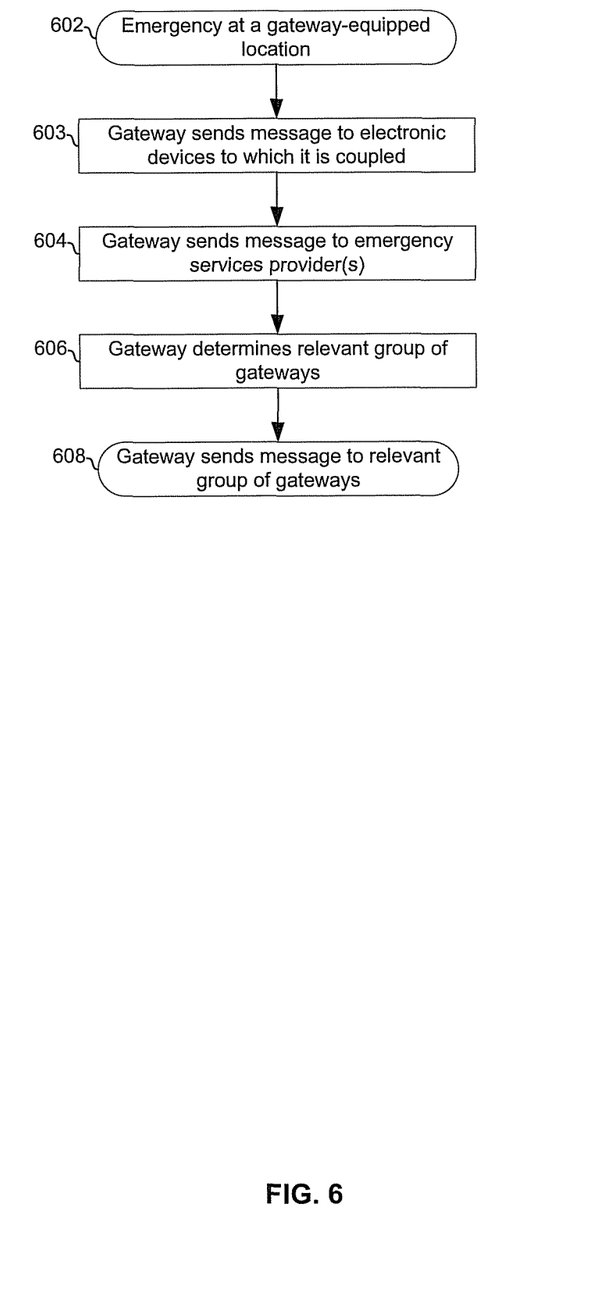
FIG. 6 is a flow chart illustrating exemplary steps for the communication of emergency-related messages generated by a broadband gateway, in accordance with an embodiment of the invention.

FIG. 6 is a flow chart illustrating exemplary steps for the communication of emergency-related messages generated by a broadband gateway, in accordance with an embodiment of the invention. Referring to FIG. 6, the exemplary steps may begin with step 602 in which an emergency may be detected in broadband gateway equipped location $106_n$. For example, a smoke, security, or carbon monoxide alarm may activate and send an emergency notification message to the broadband gateway $104_n$ in the location $106_n$. In step 603, the broadband gateway $104_n$ may distribute alert messages to electronic devices 204 communicatively coupled to the broadband gateway $104_n$. In step 604, the broadband gateway $104_n$ may generate an alert message and send it to the emergency services provider network 102. In step 606, the broadband gateway $104_n$ may determine if other ones of the broadband gateways 104 are to be notified of the emergency. For example, the broadband gateway $104_n$ may determine that the emergency is relevant to a particular physical area. Additionally or alternatively, the broadband gateway $104_n$ may determine that the emergency affects broadband gateways and/or broadband gateway users sharing particular characteristics. In step 608, the broadband gateway $104_n$ may send one or more alert messages to the broadband gateways determined in step 606.

Figure 7:
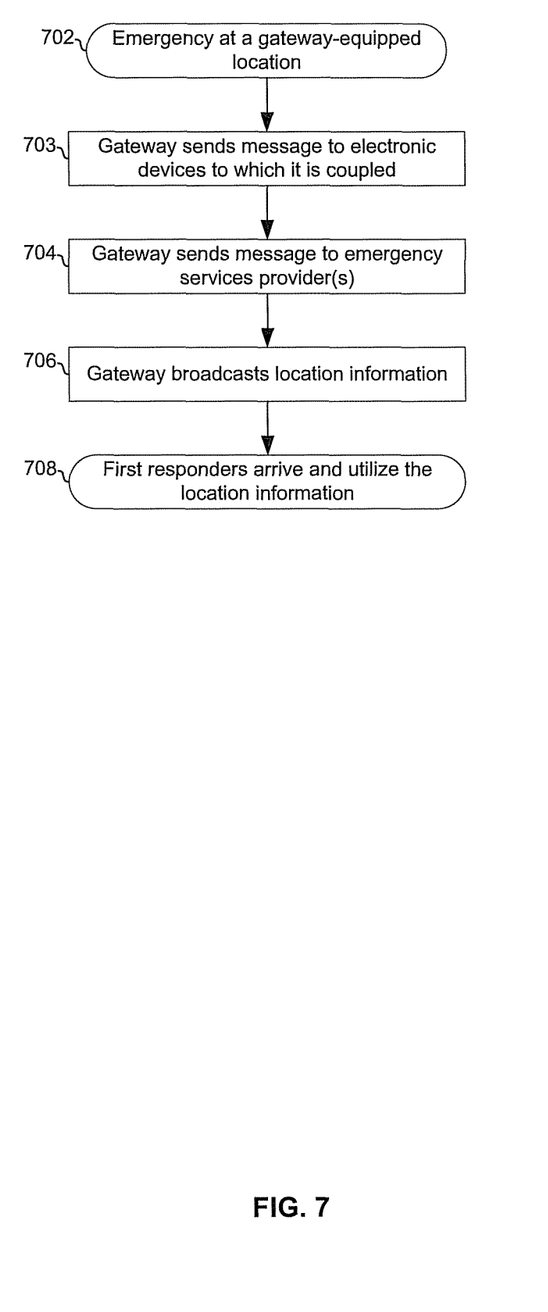
FIG. 7 is a flow chart illustrating exemplary steps for notification of emergency services providers by a broadband gateway, in accordance with an embodiment of the invention.

FIG. 7 is a flow chart illustrating exemplary steps for notification of emergency services providers by a broadband gateway, in accordance with an embodiment of the invention. Referring to FIG. 7, the exemplary steps may begin with step 702 in which an emergency may be detected in a broadband gateway equipped location $106_n$. For example, a smoke, security, or carbon monoxide alarm may activate and send an emergency notification message to the broadband gateway $104_n$. In step 703, the broadband gateway $104_n$ may distribute alert messages to electronic devices 204 communicatively coupled to the broadband gateway $104_n$. In step 704, the broadband gateway $104_n$ may generate an alert message and send it to the emergency services provider network 102. In addition to indicating the presence of an emergency and the type of emergency at the location $106_n$, the alert message may communicate location specific information. Examples of such location specific information comprise readings from various sensors at the location $106_n$, medical information about inhabitants of the location $106_n$, structural information about the location $106_n$, and/or information which may have been entered by a user of the broadband gateway $104_n$. In step 706, the broadband gateway 706 may begin broadcasting and/or otherwise communicating location specific information for use by first responders. For example, the broadband gateway $104_n$ may begin broadcasting location specific information via a Wi-Fi, AM or FM radio, and/or cellular interface of the broadband gateway $104n$. In step 708, first-responders may arrive on the scene and tune their phones, computers, radios, or other equipment to the broadcast in order to receive the location specific information.

Various aspects of a method and system for providing emergency-related services via a broadband gateway are provided. In an exemplary embodiment of the invention, a broadband gateway $104_n$ may enable communication with one or more electronic devices and may be operable handle at least one physical layer connection to at least one network access service provider. The gateway $104_n$ may receive one or more emergency notification messages, generate one or more alert messages in response to the received one or more emergency notification messages, and communicate the one or more alert messages to one or more electronic devices 204. Accordingly, each of the one or more alert messages may be formatted for communication to a corresponding one or corresponding ones of the one or more electronic devices 204. The broadband gateway $104_n$ may receive the one or more emergency notification messages via the at least one physical layer connection to at least one network access service provider 120. The one or more emergency notification messages may be generated by an emergency services provider in response to an emergency. The emergency services provider may send a notification message to the broadband gateway upon determining that a location $106_n$ of the broadband gateway $104_n$ is affected by the emergency and/or upon determining that the broadband gateway $104_n$, a person associated with the broadband gateway $104_n$, and/or a location $106_n$ associated with the broadband gateway $104_n$ meets particular criteria. The location of the broadband gateway $104_n$ may be determined utilizing one or more of a cellular interface 354 of the broadband gateway $104_n$, a GNSS interface 370 of the broadband gateway $104_n$, a network address of the broadband gateway $104_n$, account information associated with the broadband gateway $104_n$, a telephone number associated with the broadband gateway $104_n$, and user input provided to or stored in the broadband gateway $104_n$.

The emergency notification messages may be received from one or more of the electronic devices 204. In response, the broadband gateway $104_n$ may generate one or more alert messages formatted for communication over the at least one physical layer connection to at least one network access service provider 120 and may communicate one or more of the alert messages to an emergency services provider and/or to one or more other ones of the broadband gateways $104_1$-$104_N$. The other ones of the broadband gateways $104_1$-$104_N$ to which alert messages are sent may be determined based on one or both of: characteristics of the broadband gateway 104 and the other ones of the broadband gateways $104_1$-$104_N$, and user information associated with the broadband gateway $104_n$ and the other broadband gateways $104_1$-$104_N$. The electronic devices 204 may comprise devices utilized by first responders upon arriving at a location $106_n$ of the broadband gateway $104_n$. The broadband gateway $104_n$ may also transmit location specific information to the one or more electronic devices 204, where the location specific information may comprise one or both of medical information for people associated with a location of the broadband gateway, and structural information about the location $106_n$ of the broadband gateway $104_n$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing emergency-related services via a broadband gateway.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
  a broadband gateway in communication with a first electronic device and a second electronic device, wherein the broadband gateway is configured to provide content via a network access service provider to at least one of the first electronic device or the second electronic device, wherein the broadband gateway comprises:
  circuitry that receives an emergency notification message from the first electronic device, wherein the emergency notification message indicates that an emergency has been detected by the first electronic device;
  circuitry that generates a first emergency alert in response to the emergency notification message;
  circuitry that transmits the first emergency alert to the second electronic device;
  circuitry that generates a second emergency alert in response to the emergency notification message;
  circuitry that transmits the second emergency alert and structural information for a location of the emergency via an emergency services provider network to a device associated with an emergency service provider, the structural information comprising physical layout information of the location of the emergency for use by the emergency service provider to address the emergency;
  circuitry that determines, according to a physical area of the emergency and a location of an additional broadband gateway, to notify the additional broadband gateway about the emergency;
  circuitry that generates a third emergency alert in response to the determination and the emergency notification message; and
  circuitry that transmits the third emergency alert to the additional broadband gateway, wherein the broadband gateway is located in a first broadband gateway equipped location, wherein the additional broadband gateway is located in a second broadband gateway equipped location, and wherein the first broadband gateway equipped location is transmitted in conjunction with the third emergency alert to the additional broadband gateway.

2. The system of claim 1, wherein the information that identifies the first broadband equipped location is transmitted in conjunction with the second emergency alert to the device associated with the emergency service provider.

3. The system of claim 1, wherein medical information corresponding to an individual associated with the emergency alert is transmitted in conjunction with the second emergency alert is transmitted to the device associated with the emergency service provider.

4. The system of claim 1, wherein the circuitry that determines to notify the additional broadband gateway about the emergency comprises circuitry that determines to notify the additional broadband gateway about the emergency according to the physical area of the emergency, the location of the additional broadband gateway, and a characteristic of the additional broadband gateway.

5. The system of claim 1, wherein structural information for a location of the emergency is transmitted in conjunction with the second emergency alert to the device associated with the emergency service provider.

6. A system comprising:
  a broadband gateway in communication with an electronic device, wherein the broadband gateway is configured to provide content from a network access service provider to the electronic device, wherein the broadband gateway comprises:
  circuitry that receives an emergency notification message from the electronic device, wherein the emergency notification message indicates that an emergency has been detected by the electronic device;
  circuitry that generates an emergency alert in response to the emergency notification message;

circuitry that determines, according to a physical area of the emergency and a location of a neighboring broadband gateway, to notify the neighboring broadband gateway about the emergency; and circuitry that transmits via an emergency services provider network the emergency alert to notify an emergency services entity that the emergency exists, wherein structural information for a location of the emergency is transmitted in conjunction with the emergency alert, the structural information comprising physical layout information of the location for use by an emergency response entity to address the emergency.

7. The system of claim 6, wherein information that identifies a location of the electronic device is transmitted in conjunction with the emergency alert.

8. The system of claim 6, wherein information that identifies a location of the broadband gateway is transmitted in conjunction with the emergency alert.

9. The system of claim 6, wherein the emergency alert is transmitted to a device associated with an emergency service provider.

10. The system of claim 6 wherein:
the emergency alert is transmitted to another electronic device that is in communication with the broadband gateway; and
the broadband gateway, the electronic device, and the other electronic device are located in a same broadband gateway equipped location.

11. The system of claim 6, wherein: the broadband gateway is located in a first broadband gateway equipped location; and the emergency alert is transmitted to another broadband gateway that is located in a second broadband gateway equipped location.

12. The system of claim 6, wherein information specifying the location of the emergency is transmitted in conjunction with the emergency alert.

13. The system of claim 6, wherein medical information corresponding to an individual associated with the emergency is transmitted in conjunction with the emergency alert.

14. A method comprising:
receiving, in a broadband gateway that handles a physical layer connection to a network access service provider, an emergency notification from an electronic device, wherein the emergency notification indicates that an emergency has been detected by the electronic device;

generating, using the broadband gateway, an emergency alert in response to the emergency notification;

determining, according to a physical area of the emergency and a location of a neighboring broadband gateway, to notify the neighboring broadband gateway about the emergency; and transmitting, using the broadband gateway, the emergency alert via an emergency services provider network to notify an emergency response entity that the emergency exists, wherein structural information for a location of the emergency is transmitted in conjunction with the emergency alert, the structural information comprising physical layout information of the location for use by the emergency response entity to address the emergency.

15. The method of claim 14, wherein generating the emergency alert comprises formatting the emergency alert for display on a display device.

16. The method of claim 14, wherein transmitting the emergency alert comprises calling a telephone.

17. The method of claim 14, wherein the emergency alert is transmitted to a device associated with an emergency service provider.

18. The method of claim 14, wherein:
the emergency alert is transmitted to another electronic device that is in communication with the broadband gateway; and
the broadband gateway, the electronic device, and the other electronic device are located in a same broadband gateway equipped location.

19. The method of claim 14, wherein:
the broadband gateway is located in a first broadband gateway equipped location; and
the emergency alert is transmitted to another broadband gateway that is located in a second broadband gateway equipped location.

20. The method of claim 14, wherein medical information associated with an individual is transmitted in conjunction with the emergency alert.

21. The method of claim 14, wherein the structural information comprises at least one of a floor plan, a shut-off valve location, or a flammable materials location.

* * * * *